United States Patent [19]
Kehr et al.

[11] 3,803,067
[45] Apr. 9, 1974

[54] FIRE-RETARDANT POLYOLEFIN COMPOSITIONS

[75] Inventors: Helmut Kehr, Dorsten; Hermann Körner, Recklingshausen; Theodor Laus, Gelsenkirchen-Buer; Leo Rensmann, Dorsten, all of Germany

[73] Assignee: Veba Chemie AG, Postfach, Germany

[22] Filed: Jan. 31, 1972

[21] Appl. No.: 222,324

[30] Foreign Application Priority Data
Feb. 4, 1971 Germany............................ 2105187

[52] U.S. Cl. ...... 260/28.5 A, 260/41 B, 260/45.75 B
[51] Int. Cl. ........................ C08f 45/04, C08f 45/52
[58] Field of Search ................ 260/28.5 A, 41, 41 B

[56] References Cited
UNITED STATES PATENTS

| | | | |
|---|---|---|---|
| 3,264,253 | 2/1966 | McCulloch ........................... | 260/41 |
| 3,425,981 | 2/1969 | Puletti................................. | 260/41 |
| 3,553,302 | 1/1971 | Susuki................................ | 264/211 |
| 3,577,372 | 5/1971 | Flanagan et al. .............. | 260/28.5 A |
| 3,516,959 | 6/1970 | Jonas............................. | 260/28.5 A |
| 2,861,967 | 11/1958 | Ellis et al........................ | 260/28.5 A |
| 3,331,797 | 7/1967 | Kopetz et al................... | 260/28.5 A |
| 3,474,067 | 10/1969 | Praetzel et al........................ | 260/41 |
| 3,510,429 | 5/1970 | Iserson et al.................... | 106/15 FP |
| 3,202,567 | 8/1965 | Muri et al............................. | 260/41 |

OTHER PUBLICATIONS

Gloor, Def. Pub. Ser. No. 881,620 filed, 12/2/69, published in 88Z 0.6.1345 on 1/26/71.
Modern Plastics Encyclopedia, Vol. 47, No. 10A, Oct. 1970, pages 854–855, TP 986 A2 M5.
Fire Retardant Paints, Advances in Chemistry Series, No. 9, March 1953, ACS, page 86, TP 936 A5.

*Primary Examiner*—Morris Liebman
*Assistant Examiner*—J. H. Derrington
*Attorney, Agent, or Firm*—Burgess, Dinklage & Sprung

[57] ABSTRACT

A fire-retardant atactic polyolefin composition suitable for making coatings, the composition containing by weight about 0.1 to 10 percent of antimony trioxide, 1 to 10 percent of a chlorinated paraffin comprising in excess of about 30 percent by weight of chlorine, and about 5 to 85 percent of an inert filler, the balance consisting essentially of said atactic polyolefin.

3 Claims, No Drawings

FIRE-RETARDANT POLYOLEFIN COMPOSITIONS

The invention relates to fire-retardant atactic polyolefin compositions containing fillers which do not destroy the fire-retardancy.

Whereas solutions and dispersions have heretofore been used for the most part in making coatings and agglutinations of all types, molten masses have recently been increasing in importance because of the absence of solvents, their rapid initiation of adhesion and their rapid set.

Atactic polyolefins are particularly suited as raw material for the production of melts, for the coating of textile material, webs, sheets and solid structures. For example, carpet tiles and insulating panels as in automobiles are frequently manufactured by use of atactic polyolefins. For the above described purposes the polyolefins are generally combined with fillers either as such or in admixture with other polymers, resins, waxes, softeners, and the like. A disadvantage of such coating masses, however, is their flammability, whereby the embedded filler particles act as a wick. Thus, for example, a mass composed of 30 parts by weight of atactic polypropylene and 70 parts by weight of mineral fillers will completely burn down after short exposure to a flame.

It is known to impart fire-retardant properties to crystalline polypropylene by the addition of antimony trioxide and chloroparaffin. The flame retardancy of such products is, however, drastically reduced or even completely eliminated by the usual fillers, such as chalk, calcite, asbestos, asbestine, talcum, and the like.

It is accordingly an object of the present invention to impart fire retardant properties to polyolefin melt coatings.

This and other objects and advantages are realized in accordance with the present invention pursuant to which there is provided a fire-retardant atactic polyolefin composition containing by weight about 0.1 to 10 percent of antimony trioxide, 1 to 10 percent of a chlorinated paraffin comprising in excess of about 30 percent by weight of chlorine, and about 5 to 85 percent of an inert filler, the balance consisting essentially of said atactic polyolefin.

The chlorinated paraffin, as noted, is present in about 1 to 10 percent by weight of the composition, preferably about 2 to 5 percent. It comprises a paraffin such as a paraffin wax which has been chlorinated to the extent that it has a chlorine content in excess of about 30 percent by weight, preferably of about 70% by weight. Suitable substances are those sold by ICI under the trademark Cereclor, especially Cereclor 70 which is a waxy solid having a 70 percent chlorine content.

The fillers are such as under the conditions of use are inert, i.e. far less reactive with halogen and halogen containing compounds than the antimony trioxide. Suitable fillers include fluorspar, barite, calcium sulfate, quartz, aluminum silicate, glass, and the like, individually and in combination. The filler may comprise about 5 to 85 percent by weight of the composition but preferably is present in about 60 to 80 percent by weight. Preferred fillers include calcium sulfate and especially barite.

The balance of the composition consists essentially of the atactic polyolefin which preferably comprises polypropylene but other atactic normally solid amorphous homopolymers or copolymers of α-olefins such as polybutylene, ethylene-propylene copolymer, and the like, may also be employed. The atactic polyolefins are predominantly amorphous products which, however, can also contain isotactic portions, especially for increasing hardness.

The molten mass or composition to be melted may further contain minor amounts of pigments, stabilizers, antioxidants, and conventional additives.

The invention will be further described with reference to the following illustrative examples wherein all parts are by weight unless otherwise expressed.

EXAMPLE 1

The following composition was prepared by melting the polypropylene and admixing the other compound by means of a stirrer.

25 parts of atactic polypropylene (melt viscosity/170°C: 20,000 cP, Penetration 24 1/10 mm)

75 parts of barite
3 parts of chloroparaffin (Cereclor 70 of ICI)
0.5 part of antimony trioxide
0.2 part of Topanol CA (ICI antioxidant comprising 3:1 condensate of 3-methyl-6-t-butyl-phenol and crotonaldehyde)
0.2 part of dilaurylthiodipropionate
0.2 part of calcium stearate A sheet was formed from this composition by means of a doctor's knife. A specimen was tested in accordance with DIN 22,103. The median post-burning duration was 0.8 second. The particles which dripped off did not burn.

EXAMPLE 2: (Comparison Example)

A melt mass as defined in Example 1 was produced with the only difference that calcite was used instead of barite as filler. The mass was not flame-retardant and burned up completely after exposure for 15 seconds to a Bunsen burner.

EXAMPLE 3

A melt was formed of:
30 parts of atactic polypropylene as in Example 1
70 parts of calcium sulfate
5 parts of chloroparaffin (Cereclor 70)
1 part of antimony trioxide
0.2 part of Topanol CA
0.2 part of dilaurylthiodipropionate
0.5 part of Mark WS (Argus Chemical heat stabilizer comprising barium, cadmium mixed salt of long chain fatty acid).

The testing in accordance with DIN 22,103 resulted in a median post-burning duration of 0.5 seconds. Dripping-off particles did not burn.

Example 4:

There was produced a molten mass as in Example 1, replacing the polypropylene by 25 parts of atactic polybutene-1 (melt viscosity/170°C; 12,000 cP, penetration 40 1/10 mm). The mass was flame retardant, the median post-burning duration was 0.9 second. Dripping-off particles did not burn.

It will be appreciated that the instant specification and examples are set forth by way of illustration and not limitation and that various modifications and changes may be made without departing from the spirit and scope of the present invention.

What is claimed is:

1. A fire retardant atactic polyolefin composition containing by weight about 0.1 to 10 percent of antimony trioxide, 1 to 10 percent of a chlorinated paraffin comprising in excess of about 30 percent by weight of chlorine, and about 5 to 85 percent of barite the balance consisting essentially of said atactic polyolefin.

2. A composition according to claim 1, wherein said antimony trioxide is present in about 0.3 to 1 percent by weight, said chlorinated paraffin is present in about 2 to 5 percent by weight and said barite is present in about 60 to 80 percent by weight.

3. A composition according to claim 2, wherein said chlorinated paraffin contains chlorine to the extent of about 70 percent by weight.

* * * * *